March 21, 1939.　　A. A. BUCHNER　　2,151,419
ADJUSTABLE SEAT
Filed Dec. 17, 1934
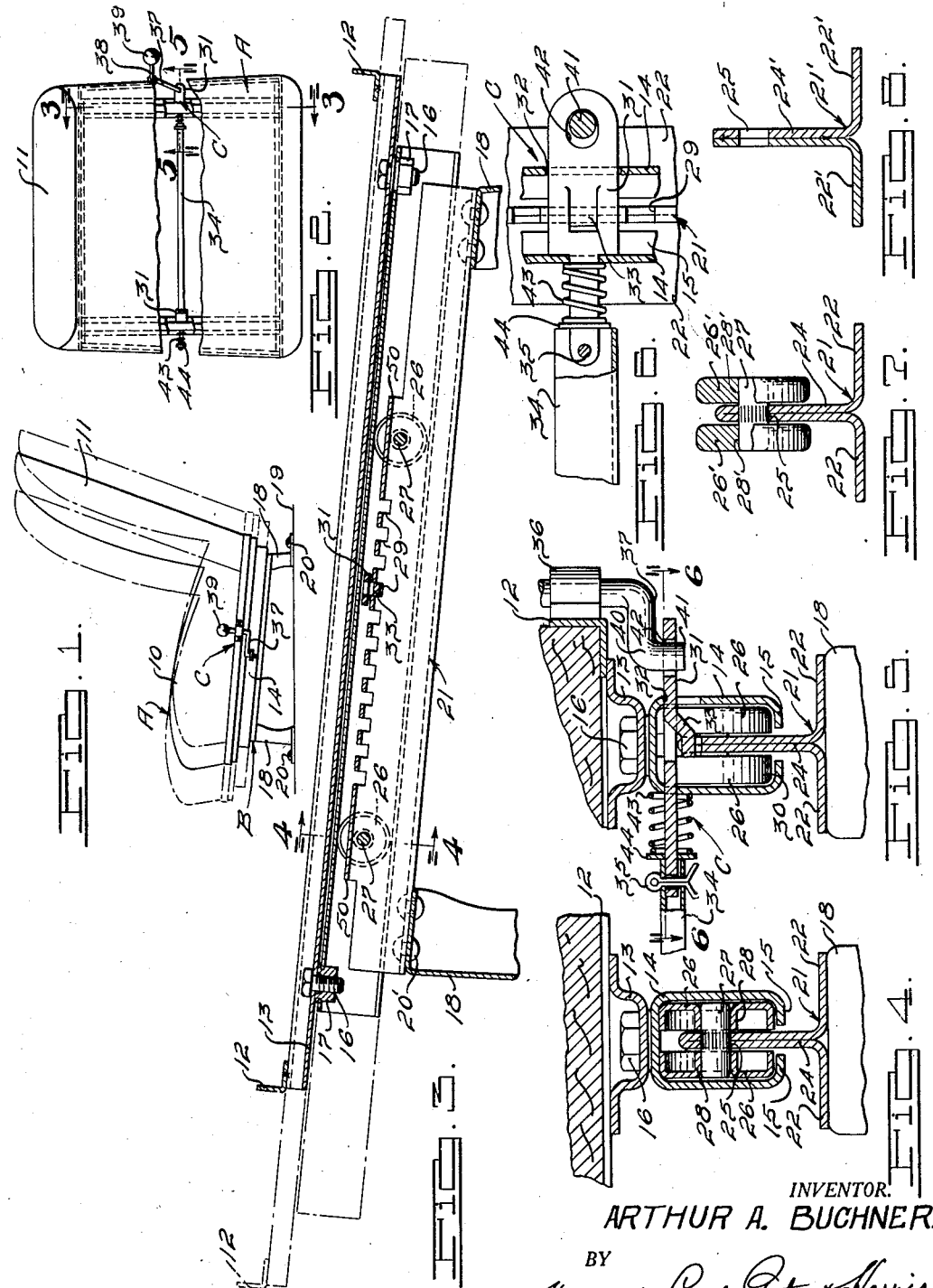
INVENTOR.
ARTHUR A. BUCHNER.
BY
Harness, Lind, Patee & Harris
ATTORNEYS.

Patented Mar. 21, 1939

2,151,419

UNITED STATES PATENT OFFICE 2,151,419

ADJUSTABLE SEAT

Arthur A. Buchner, Detroit, Mich., assignor to Chrysler Corporation, Detroit, Mich., a corporation of Delaware Application December 17, 1934, Serial No. 757,802

2 Claims. (Cl. 155—14)

This invention relates to an adjustable seat and more particularly to an improved mounting mechanism for moving the seat relative to its support.

It is desirable in a vehicle body structure to have a seat, usually in the driver's compartment, which may be moved longitudinally of the vehicle to vary the distance between the seat and the forward end wall of the body to provide suitable leg room for the operator and maintain a comfortable operating position. To accomplish this the seat structure has a stationary support and a seat proper which may be moved relative to the support. Various means have been devised for obtaining this movement, generally such means consisting of slidable parts which are moved by the application of force exerted by the body of the occupant to some part of the seat. When it is desired to move the seat rearwardly of the support, the body pressure of the occupant is directed against the rearward part of the seat, with a resulting tendency toward upward tilting of the forward part. This action results in a tendency toward binding between the stationary and relatively movable parts to such an extent that free and easy movement is not possible. The same objectionable action results when an attempt is made to move the seat forwardly of the support.

An object of the present invention is to overcome these difficulties by providing a mechanism which will permit free and easy movement between the stationary and relatively movable parts of the seat structure; to provide such a mechanism which will be free of binding engagement between such parts when the seat is subjected to tilting tendency and which will operate with a minimum of effort; to provide rolling contact between the stationary and relatively movable parts which will eliminate binding engagement between such parts regardless of the direction or disposition of the seat load.

Other objects of the invention are to provide a simple construction, the component parts of which may be manufactured and assembled at a relatively low cost.

Further objects and advantages of the invention will be apparent from the following detailed illustrative embodiments of the principles of the invention, reference being had to the accompanying drawing, in which:

Fig. 1 is a view in side elevation of a seat structure embodying the invention.

Fig. 2 is a top plan view of the seat, a part thereof being broken away to illustrate the adjusting mechanism.

Fig. 3 is a longitudinal sectional view taken on the line 3—3 of Fig. 2, with the seat cushion removed.

Fig. 4 is a fragmentary transverse sectional view taken on the line 4—4 of Fig. 3.

Fig. 5 is a fragmentary sectional view taken on the line 5—5 of Fig. 2.

Fig. 6 is a detail plan sectional view taken as indicated by the line 6—6 of Fig. 5.

Fig. 7 is an elevational view, mainly in section, illustrating a modified form of the rollers and their supporting member.

Fig. 8 is a sectional view of a modified form of the supporting member illustrated in Figs. 4 and 7.

In the embodiment of the invention herein illustrated I have shown a seat A, a support B, generally considered the movable and stationary parts, respectively, and a latching mechanism C.

The seat A includes a seat cushion 10, a back 11, disposed in angular relationship, and a suitable supporting frame structure 12. A substantially U-shaped member 13 having laterally projecting flanges is secured to the under side of the frame structure 12, one of such members being disposed adjacent each outer edge portion of the frame and longitudinally of the vehicle. A channel 14 having open ends and inwardly extending flanges 15 is secured to each of the members 13 by bolts 16 which engage clinch nuts 17 carried by and having the major portion thereof within the channel 14. The nuts 17 are located adjacent each end of the channel 14.

The support B, generally referred to as the stationary part of the seat structure, includes a pair of spaced bars 18 extending transversely of the vehicle body and which are secured to the floor 19 thereof by bolts 20. It will be noted that the forwardly positioned bar 18 is somewhat higher than the rearward one, resulting in the seat A having a rearward inclination which has been found to give added comfort to the occupant. Mounted transversely of the bars 18 and secured thereto by rivets 20' is a pair of rails or supports 21, constituting a track, one of such rails registering with each of the channels 14 in the seat part A. The rail 21 is substantially T-shaped and as shown in Figs. 4, 5 and 7 has laterally projecting flanges 22, forming a base, and an upright 24, substantially perpendicular to the flanges 22. The upright 24 is formed by reversely bending the intermediate portion of the metal, the reversely bent parts being in abutting relationship although such parts may, if desired, be spaced. A modified form is illustrated in Fig. 8 wherein the rail or support 21' is substantially T-shaped and has laterally projecting flanges 22' and an upright 24' substantially perpendicular to the flanges 22'. The support 24' is formed by welding or otherwise securing together two angle bars. Each of the parts 21 and 21' is provided with longitudinally spaced notches 29 formed in the upright 24, 24' for receiving a part of the latch mechanism C hereinafter more fully described.

A plurality of rollers 26 are rotatably supported relative to each of the rails 21 by means of pins 27 extending through transverse openings 25 in the rails 21. Each of the pins 27 has a knurled or roughened surface intermediate its ends engaging the surface of the opening 25 for preventing rotation of the pin relative to the rail. The roller 26 may be a stamping substantially cylindrical in cross section and has a central hub 28 receiving the pin 27 for rotation relative thereto, and a circular flange substantially parallel with the hub 28. Pairs of rollers 26, one on either side of the rail 21, are supported by the pins 27 at spaced locations on the rail, as shown in Fig. 3.

As shown in Fig. 7, the rollers 26' are solid, circular pieces, each having a central opening 28' receiving the pin 27 for support on the rail 21. The rollers 26' may be cut from bar stock of suitable dimensions.

When the seat A is mounted relative to the support B, as particularly shown in Fig. 4, the rollers 26 are received within and support the channels 14 and any substantial movement, other than longitudinally of the vehicle, is prevented. A slight clearance is provided between the rollers 26 and the internal surface of the channel, as indicated at 30 in Fig. 5, to prevent binding of the parts. When longitudinal movement of the seat A is desired, the latter is moved bodily relative to the support B through rolling contact provided between the rollers 26 mounted on the rail 21 and the inner surface of the channel 14. Such movement of the part A relative to the part B is generally induced by application of force directed to a portion of the seat A by the occupant or occupants through body contact. If movement is to be rearward, the force is generally directed to the rearward part of the seat A, which results in the latter tilting relative to the support B with a tendency of the parts to bind. However, in the improved mechanism herein illustrated, when the seat A is tilted during such movement and inclined toward the rear, the channel 14 of the movable part A will engage at least the upper portion or face of the rearwardly positioned pair of rollers and the lower portion or face of the forwardly positioned pair of rollers on each of the rails 21.

In order to prevent separation of the seat A from the support B through longitudinal movement, such movement of the seat A is limited in either direction by the shoulder 50 at either end of the rail 21 striking one of the clinch nuts 17 carried by the channel. In assembly, the channel 14 is slid longitudinally of the rail 21 prior to clinching the nuts 17 in position.

As a means for retaining the seat A and support B in a selective position of adjustment I have provided the latch mechanism generally designated at C and which includes a bar 31 received in a transverse slot 32 in each of the channels 14. The slot 32 is substantially midway between the ends of the channel 14 and adjacent the side thereof engaged by the member 13. A tongue 33 is struck out of the intermediate part of the bar 31 and is adapted to be received in the notches 29 of the rail 21 for retaining the movable part A in a selective position of adjustment.

The latch bars 31 are operatively connected by an arm 34 for manipulation by a single control on the outer longitudinal edge of the seat A. The arm 34 is substantially U-shaped and has each of its opposite ends connected with one of the ends of the bars 31, the parts so connected being held against separation by means of a cotter pin 35 inserted through registering apertures of the engaged parts.

The latch control is journaled on the frame 12 by means of a bracket 36 and includes a bar having angularly disposed arms 37 and 38, the latter having a manually engageable part 39. The arm 37 has its end portion bent at right angles, as shown at 40 in Fig. 5, the extremity 41 thereof being bent substantially parallel to the main body of the arm and received in an aperture 42 of the latch bar 31. Movement of the arm 38 causes the angular part 40 of the arm 37 to swing outwardly, withdrawing the bars 31 transversely of the channels 14 sufficiently to disengage the tongues 33 from the notches 29. Transverse movement of the bars 31 is opposed by a spring 43 positioned on each of the bars 31 and having one of its ends seated against a pressure ring 44 carried by the bar 31 and the adjacent side of the channel 14.

What I claim is:

1. In an adjustable seat including a supporting structure and a seat structure, means movably mounting said seat structure on said supporting structure including spaced downwardly opening channel-shaped members secured to said seat structure, each of said members having an upper bearing surface and having the free edges thereof turned inwardly to form a lower bearing surface, transversely spaced substantially T-shaped rails each having the lateral projections thereof secured to said support structure and having the upright portion projecting into a respective channel member, anti-friction means rotatably carried by the upright portion of each of said rails for slidably supporting a respective channel member thereon, each of said anti-friction means including a plurality of pairs of anti-friction members disposed in longitudinally spaced relation, the members of each of said pairs being disposed on respectively opposite sides of a rail and having a common axis of rotation, all of said channel members and said anti-friction members being so arranged that said anti-friction members engage only said upper bearing surfaces when said seat structure is in its normal position, and at least some of said anti-friction members being adapted to engage only said lower bearing surfaces when said seat structure is tilted from its said normal position.

2. In an adjustable seat including a supporting structure and a seat structure, means movably mounting said seat structure on said supporting structure including spaced channel-shaped members secured to one of said structures, each of said members having a bearing surface and having the free edges thereof turned inwardly to form a bearing surface opposed to said first mentioned bearing surface, transversely spaced rails each having a lateral projection secured to the other of said structures and having a vertical projection extending into a respective channel member, anti-friction means rotatably carried by the vertical projection of each of said rails for shiftably supporting a respective channel member thereon, each of said anti-friction means including a plurality or pairs of anti-friction members disposed in longitudinally spaced relation, the members of each of said pairs being disposed on respectively opposite sides of a rail and having a common axis of rotation, all of said channel members and said anti-friction members being so arranged that said anti-friction members engage only one of said bearing surfaces when said seat structure is in its normal position, and at least some of said anti-friction members being adapted to engage only the other of said bearing surfaces when said seat structure is tilted from its said normal position.

ARTHUR A. BUCHNER.